(12) United States Patent
Yoon et al.

(10) Patent No.: US 12,512,891 B2
(45) Date of Patent: Dec. 30, 2025

(54) WIRELESS COMMUNICATION DEVICE TRANSMITTING AND RECEIVING DATA USING CHANNEL STATE INFORMATION FEEDBACK AND OPERATING METHOD THEREOF

(71) Applicant: SAMSUNG ELECTRONICS CO., LTD., Suwon-si (KR)

(72) Inventors: Hongsik Yoon, Suwon-si (KR); Jinwoo Oh, Suwon-si (KR); Junho Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 285 days.

(21) Appl. No.: 18/177,372

(22) Filed: Mar. 2, 2023

(65) Prior Publication Data

US 2023/0291457 A1   Sep. 14, 2023

(30) Foreign Application Priority Data

Mar. 10, 2022   (KR) .................. 10-2022-0030328
Jul. 6, 2022   (KR) .................. 10-2022-0083160

(51) Int. Cl.
*H04B 7/06*   (2006.01)
*H04L 5/00*   (2006.01)
*H04W 52/52*   (2009.01)

(52) U.S. Cl.
CPC ......... *H04B 7/0632* (2013.01); *H04B 7/0617* (2013.01); *H04B 7/0639* (2013.01); *H04L 5/0048* (2013.01); *H04W 52/52* (2013.01)

(58) Field of Classification Search
CPC .. H04B 7/0632; H04B 7/0617; H04B 7/0639; H04B 7/0626; H04L 5/0048; H04W 52/52
See application file for complete search history.

(56) References Cited

U.S. PATENT DOCUMENTS 9,478,857 B2   10/2016   Chang et al.
9,985,704 B2   5/2018   Lee et al.
(Continued)

FOREIGN PATENT DOCUMENTS

KR   10-2016-0094337   8/2016
WO   2021212454   10/2021

OTHER PUBLICATIONS

European Search Report dated Jul. 14, 2023 in corresponding European Patent Application No. 23160929.8 (11 pages).
(Continued)

*Primary Examiner* — Gary Mui
*Assistant Examiner* — Yewon Kim
(74) *Attorney, Agent, or Firm* — Morgan, Lewis & Bockius LLP

(57) ABSTRACT

A operating method of a wireless communication device includes transmitting a sounding reference signal (SRS) to a base station; receiving, from the base station, a first reference signal to which a second precoder is applied; generating feedback information including at least one of a rank indicator (RI) and a channel quality indicator (CQI), based on at least one of: (i) a relationship between the second precoder and a first precoder applied to a first physical downlink shared channel (PDSCH) by the base station based on the SRS; and (ii) a channel estimated by using the first reference signal; transmitting the generated feedback information to the base station; and receiving a second PDSCH to which at least one of the first precoder, the RI, and the CQI is applied.

17 Claims, 13 Drawing Sheets

(56) References Cited

U.S. PATENT DOCUMENTS

| | | | |
|---|---|---|---|
| 10,420,090 B2 | 9/2019 | Yoo et al. | |
| 10,651,911 B2 | 5/2020 | Xu et al. | |
| 10,958,320 B2 | 3/2021 | Huang et al. | |
| 2018/0241454 A1 | 8/2018 | Lee et al. | |
| 2019/0165971 A1* | 5/2019 | Manolakos | H04L 25/0226 |
| 2019/0356364 A1 | 11/2019 | Maamari et al. | |
| 2020/0099488 A1* | 3/2020 | Kim | H04B 7/063 |
| 2021/0297123 A1 | 9/2021 | Li et al. | |
| 2022/0109475 A1* | 4/2022 | Soriaga | H04W 24/10 |
| 2022/0109479 A1* | 4/2022 | Liu | H04B 7/0617 |
| 2023/0412226 A1* | 12/2023 | Hindy | H04B 7/024 |
| 2024/0171433 A1* | 5/2024 | Ahmed | H04B 7/0626 |

OTHER PUBLICATIONS

Technical Specification, ETSI TS 138 214 V16.7.0 (Oct. 2021), 5G; NR; Physical layer procedures for data, 3GPP5G; NR; Physical layer procedures for data (3GPP TS 38.214 version 16.7.0 Release 16), 176 pages.

Technical Specification, ETSI TS 138 331 V16.6.0 (Oct. 2021), 5G; NR; Radio Resource Control (RRC); Protocol specification (3GPP TS 38.331 version 16.6.0 Release 16), 948 pages.

\* cited by examiner

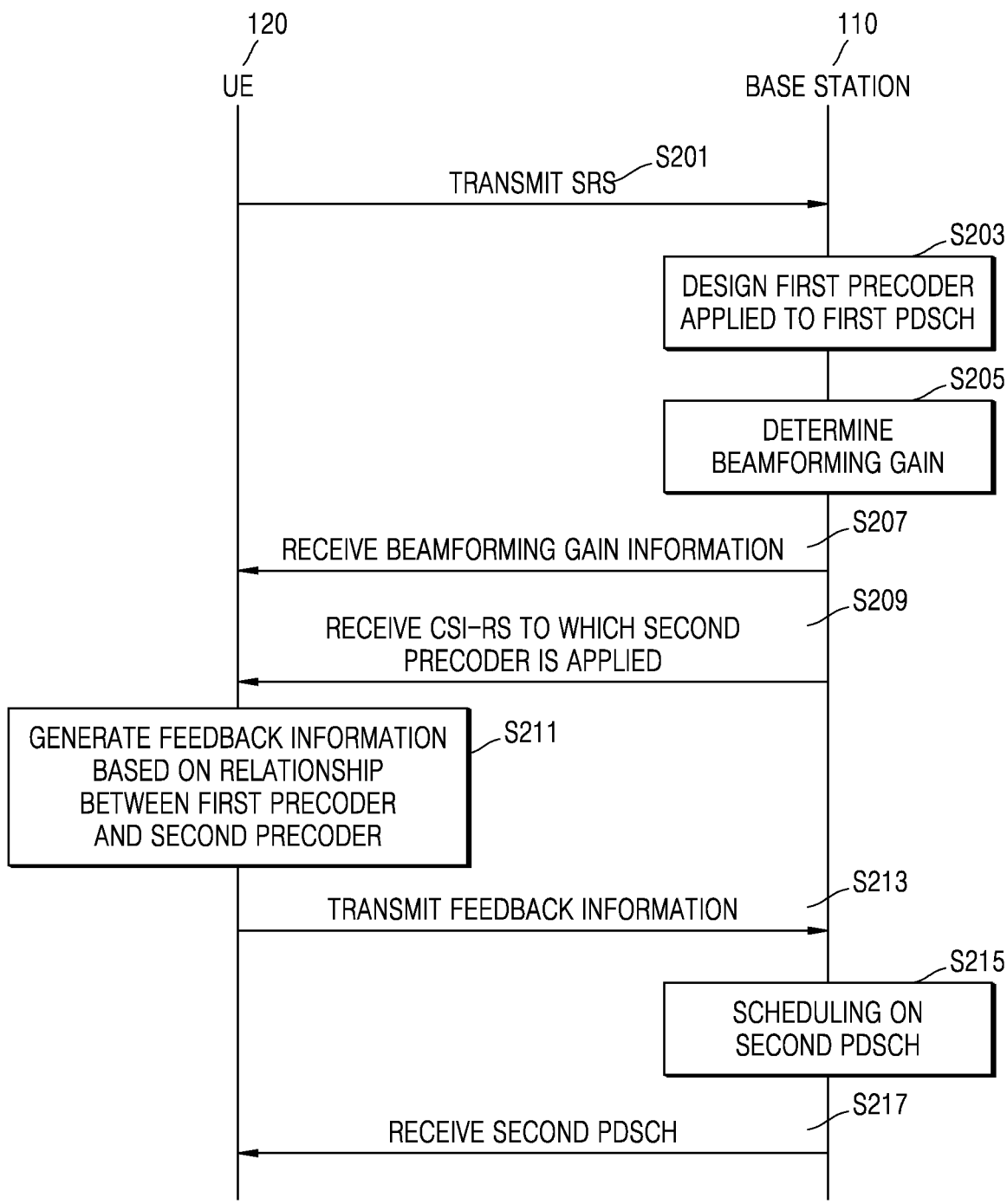

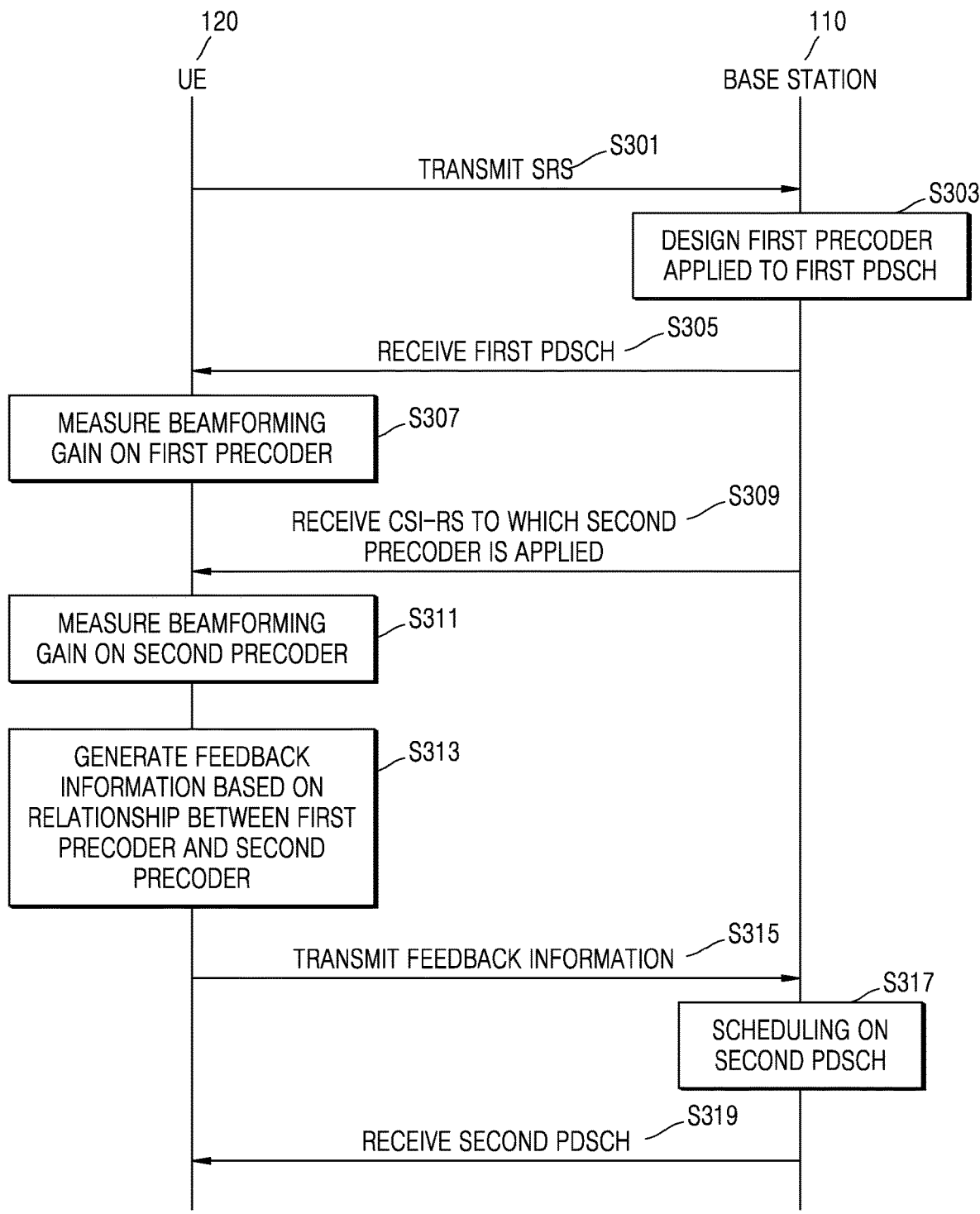

FIG. 5B

| QCL Type | Channel Properties |
|----------|--------------------|
| Type A | Doppler shift, Doppler spread, average delay, delay spread, |
| Type B | Doppler shift, Doppler spread |
| Type C | Doppler shift, average delay |
| Type D | Spatial Rx parameter |
| Type E | Beamforming gain parameter |

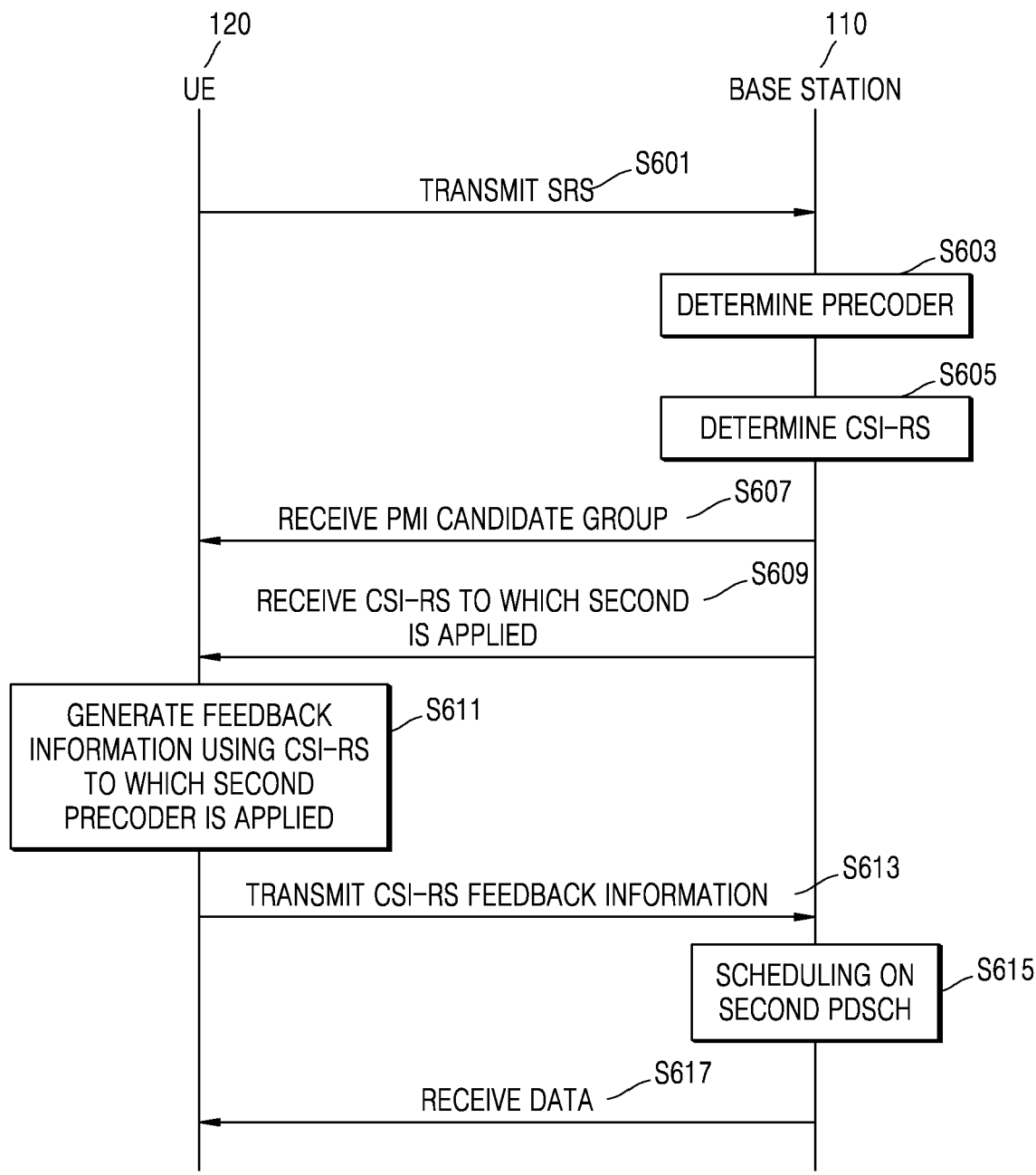

WIRELESS COMMUNICATION DEVICE TRANSMITTING AND RECEIVING DATA USING CHANNEL STATE INFORMATION FEEDBACK AND OPERATING METHOD THEREOF

CROSS-REFERENCE TO RELATED APPLICATIONS

This application is based on and claims priority under 35 U.S.C. § 119 to Korean Patent Application Nos. 10-2022-0030328, filed on Mar. 10, 2022, and 10-2022-0083160, filed on Jul. 6, 2022, in the Korean Intellectual Property Office, the disclosures of which are incorporated by reference herein in their entireties.

TECHNICAL FIELD

The present disclosure relates to a wireless communication device transmitting and receiving data using channel state information (CSI) feedback.

DISCUSSION OF RELATED ART

Precoding may be generally understood as a preprocessing method for optimizing single stream or multiple stream beamforming and thereby increase data throughput. Precoding may involve measuring the communication channel using reference signals, and thereafter weighting amplitude and phase of signals transmitted from each of multiple transmit antennas, according to the measured channel. To this end, a user equipment (UE) may transmit a sounding reference signal (SRS) to a base station (BS). The BS may estimate an uplink channel between the UE and the BS using the received SRS. The BS may design a precoder for a downlink channel using the estimated uplink channel. The precoder may be designed using the reciprocity of the estimated uplink channel and a time division duplex (TDD) channel.

Additionally or alternatively, the BS can send the reference signals to the UE to identify the channel information between the BS and the UE. For example, the BS may transmit a channel state information-reference signal (CSI-RS) to identify channel information between the BS and the UE. The UE may identify a channel between the BS and the UE through a CSI-RS received from the BS. The UE may report feedback information on the identified channel to the BS. The feedback information may include a precoding matrix indicator (PMI), a rank indicator (RI), and a channel quality indicator (CQI). The BS may design an SRS-based precoder using the received feedback information, and may transmit a physical downlink shared channel (PDSCH) to the UE using the precoder.

Through use of the SRS-based precoder based on CSI feedback, data throughput of the PDSCH is increased. Ongoing research continues to explore ways to further increase such PDSCH data throughput.

SUMMARY

Embodiments of the inventive concept provide a wireless communication device that transmits and receives data using CSI feedback, and an operating method thereof.

According to an aspect of the inventive concept, there is provided a method of operating a wireless communication device the method including transmitting a sounding reference signal (SRS) to a base station; receiving, from the base station, a first reference signal to which a second precoder is applied; generating feedback information including at least one of a rank indicator (RI) and a channel quality indicator (CQI) based on at least one of: (i) a relationship between the second precoder and a first precoder applied to a first physical downlink shared channel (PDSCH) by the base station based on the SRS, and (ii) a channel estimated by using the first reference signal; transmitting the generated feedback information to the base station; and receiving a second PDSCH to which at least one of the first precoder, the RI, and the CQI is applied.

According to another aspect of the inventive concept, there is provided a method of operating a base station, the method including receiving a sounding reference signal (SRS) from a wireless communication device, generating a first precoder based on the SRS; transmitting, to the wireless communication device, a first reference signal to which a second precoder is applied, determining a precoding matrix indicator (PMI) candidate group based on the first precoder and the second precoder; receiving feedback information on the first reference signal including at least one of a rank indicator (RI) and a channel quality indicator (CQI), and transmitting a physical downlink shared channel (PDSCH) to which at least one of the second precoder, the RI, and the CQI is applied.

According to another aspect of the inventive concept, there is provided a wireless communication device including a radio frequency integrated circuit (RFIC) configured to transmit a sounding reference signal (SRS) to a base station, and receive, from the base station, a first reference signal to which a second precoder is applied; and a processor configured to generate feedback information including at least one of a rank indicator (RI) and a channel quality indicator (CQI) on the basis of at least one of a relationship between the second precoder and a first precoder applied to a first PDSCH by the base station based on the SRS, and the estimated channel using the first reference signal. The RFIC may transmit the generated feedback information to the base station and receive a second PDSCH to which at least one of the first precoder, the RI, and the CQI is applied.

BRIEF DESCRIPTION OF THE DRAWINGS

Embodiments of the inventive concept will be more clearly understood from the following detailed description taken in conjunction with the accompanying drawings in which:

FIG. 2 is a flowchart illustrating an operating method of a UE and a base station, according to an embodiment of the inventive concept;

FIG. 3 is a flowchart illustrating an operating method of a UE and a base station, according to an embodiment of the inventive concept;

FIG. 5B illustrates a quasi-co-location (QCL)-type applicable to an embodiment of the inventive concept;

FIG. 6 illustrates an operating method of a UE and a base station, according to an embodiment of the inventive concept;

DETAILED DESCRIPTION OF EMBODIMENTS

Hereinafter, embodiments of the inventive concept will be described in detail with reference to the accompanying drawings.

Herein, a base station (BS) is a network element that communicates with a wireless communication device and allocates a communication network resource to the wireless communication device. A base station is sometimes referred to as a cell, a NodeB (NB), an eNodeB (eNB), a next generation radio access network (NG RAN), a wireless access unit, a base station controller, a node on a network, a gNodeB (gNB), a transmission and reception point (TRP), a remote radio head (RRH), or the like.

A wireless communication device is a device that communicates with a base station or another wireless communication device and may be referred to as a node, a user equipment (UE), a next generation UE (NG UE), a mobile station (MS), a mobile equipment (ME), a device, a terminal, or the like.

Some examples of a wireless communication device include a smartphone, a tablet PC, a mobile phone, an image telephone, an electronic book reader, a desktop PC, a laptop PC wallet, a netbook computer, a PDA, a portable multimedia player (PMP), an MP3 player, a medical device, a camera, and a wearable device. Other examples include a television, a digital video disk (DVD) player, an audio player, a refrigerator, an air conditioner, a cleaner, an oven, a microwave oven, a washing machine, an air purifier, a set-top box, a home automation control panel, a security control panel, a media box (e.g., Samsung HomeSync™, Apple TV™, or Google TV™), a game console (e.g., an Xbox™, PlayStation™), an electronic dictionary, an electronic key, a video camera (camcorder), and an electronic picture frame. Still other examples include at least one of various medical devices (e.g., various portable medical measuring instruments (blood glucose meters, heart rate meters, blood pressure meters, or body temperature meters), magnetic resonance angiography (MRA), magnetic resonance imaging (MRI), computed tomography (CT), a photographing device, or an ultrasonic device), a navigation device, a global navigation satellite system (GNSS), an event data recorder (EDR), a flight data recorder (FDR), a vehicle infotainment device, an electronic equipment for a ship (e.g., a navigation device for a ship, a gyro compass, etc.), an avionics, a security device, a head unit for a vehicle, an industrial or home robot, a drone, an automated teller machine (ATM) of a financial institution, a point of sales (POS) terminal of a store, or Internet of things devices (e.g., bulbs, various sensors, sprinkler devices, fire alarms, temperature controllers, street lamps, toasters, exercise equipment, hot water tanks, heaters, boilers, etc.). Further examples include various types of multimedia systems capable of performing a communication function.

Figure 1A:
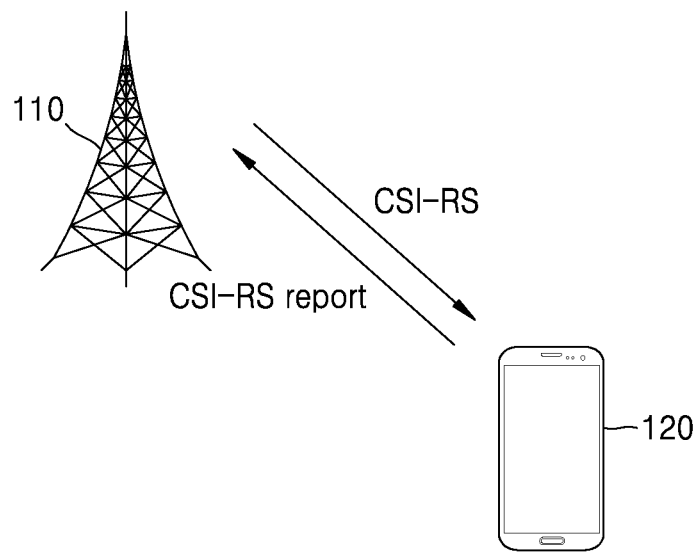
FIGS. 1A and 1B illustrate a wireless communication system according to an embodiment of the inventive concept.
Figure 1B:
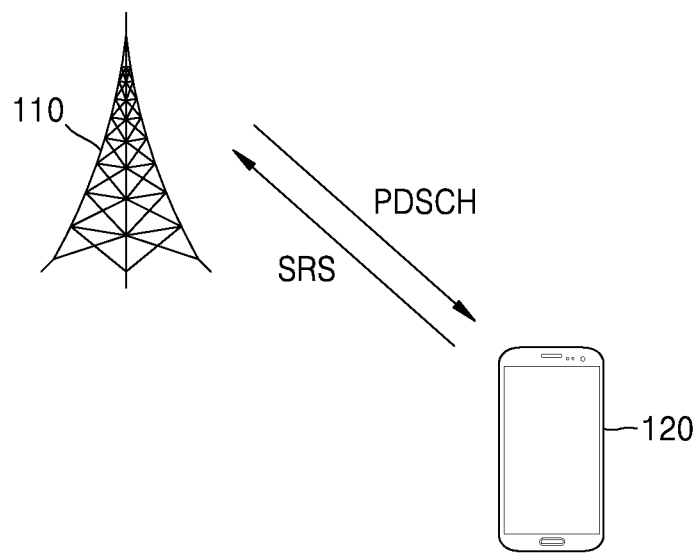

FIGS. 1A and 1B illustrate a wireless communication system according to an embodiment of the inventive concept. The wireless communication system may include a wireless communication device 120 and a base station 110. Hereinafter, wireless communication device 120 is referred to as a user equipment (UE) 120. For convenience of description, the wireless communication system is shown and described in the context of one base station 110 and one UE 120, but embodiments may be implemented with two or more base stations and/or UEs.

The base station 110 may be wirelessly connected to the UE 120 through a wireless channel to provide various communication services. The base station 110 may provide a service through a shared channel for all user traffic, and may collect and schedule state information such as a buffer state, an available transmission power state, and a channel state of the UE 120. The wireless communication system may support beamforming techniques by using orthogonal frequency division multiplexing (OFDM) schemes as wireless access techniques. In addition, the wireless communication system may support an adaptive modulation and coding (AMC) scheme that determines a modulation scheme and a channel coding rate according to the channel state of the UE 120.

In an example, the wireless communication system transmits and receives signals using a wide frequency band including a 6 GHz band. For example, a wireless communication system may use a millimeter wave band, such as a 28 GHz band or a 60 GHz band, to increase data transfer rates. In this case, since the millimeter wave band has a relatively large signal attenuation per distance, the wireless communication system may support directional beam-based transmission and reception generated using multiple antennas to secure coverage. The wireless communication system may be a system that supports multiple inputs and multiple outputs (MIMO), and accordingly, the base station 110 and the UE 120 may support beamforming techniques. Such beamforming techniques may include digital beamforming, analog beamforming, and/or hybrid beamforming.

Referring to FIG. 1A, the base station 110 may transmit a channel state information-reference signal (CSI-RS) to the UE 120. The UE 120 may estimate a channel between the base station 110 and the UE 120 using the CSI-RS. The UE 120 may generate CSI feedback information including at least one of a rank indicator (RI), a precoding matrix indicator (PMI), and channel quality information (CQI) using the estimated channel. The UE 120 may transmit the generated CSI feedback information in a CSI-RS report to the base station 110.

Referring to FIG. 1B, the UE 120 may transmit a sounding reference signal (SRS) to the base station 110. The base station 110 may estimate a channel between the base station 110 and the UE 120 using the SRS obtained in a time division duplex (TDD) transmission. The base station 110 may design a precoder to maximize the capacity of the estimated channel. The base station 110 may transmit a physical downlink shared channel (PDSCH) to the UE 120 using the designed precoder.

When the base station 110 transmits the PDSCH to the UE 120 using the precoder based on the SRS, the base station 110 may additionally use the CSI feedback information to schedule the PDSCH.

For example, the base station 110 may calculate information on a relationship between the precoder of the CSI-RS and the precoder based on the SRS and transmit the calculated information to the UE 120, in order to use the CSI feedback information when transmitting the PDSCH using the precoder based on the SRS. In addition, the UE 120 may generate CSI feedback information that corresponds to the PDSCH based on the received information.

As another example, the UE 120 may measure a beamforming gain for the PDSCH and measures a beamforming gain of the CSI-RS, and thus predict a relationship between the precoder of the PDSCH and the precoder of the CSI-RS. The UE 120 may generate CSI feedback information corresponding to the PDSCH by using information on the relationship between the precoder of the PDSCH and the precoder of the CSI-RS. The following embodiments will describe these concepts in more detail.

FIG. 2 is a flowchart illustrating an operating method of a UE and a base station according to an embodiment of the inventive concept.

Referring to FIG. 2, in operation S201, the UE 120 may transmit an SRS to the base station 110, which receives the same. The base station 110 may estimate an uplink channel and a downlink channel between the base station 110 and the UE 120 using the received SRS. In a TDD example, the base station 110 may regard an estimated uplink channel between the base station 110 and the UE 120 as a downlink channel between the base station 110 and the UE 120, by using "SRS switching" based on reciprocity. In other words, although the SRS is transmitted uplink, the base station 110 may design a downlink precoder using the uplink SRS. As described later, the base station may design a first precoder based on the SRS.

In operation S203, the base station 110 may design a first precoder applied to a first PDSCH. For instance, the base station 110 may design the first precoder to maximize the capacity of the estimated channel using the SRS.

The first precoder may be a precoder that is not based on a codebook. For example, the first precoder may include an eigen-vector of a channel between the base station 110 and the UE 120. The first precoder may have a higher resolution than a codebook-based precoder. Accordingly, when the first precoder is used for data transmission, data throughput may be higher than when a codebook-based precoder is used for data transmission. The base station 110 may design the first precoder to maximize one or more metrics, such as a mean of the mutual information per coded bit (MMIB), by using the estimated channel.

In operation S205, the base station 110 may determine a beamforming gain. The base station 110 may calculate a beamforming gain for a physical downlink shared channel (PDSCH) to which the first precoder based on the SRS is applied. To this end, the base station 110 may calculate a first beamforming gain to be realized by the UE 120 when the UE 120 receives a PDSCH to which the precoder based on the SRS is applied.

Meanwhile, the base station 110 may transmit, to the UE 120, a CSI-RS to which a second precoder is applied (S209). For example, the second precoder may be a precoder based on a CSI-RS report received by the base station 110 from the UE 120. The second precoder may be a precoder predetermined by the base station. The base station 110 may calculate a second beamforming gain realizable by the UE 120 when the UE 120 receives the CSI-RS to which the second precoder is applied. The first precoder may differ from the second precoder.

The base station 110 may calculate a first beamforming gain for the first precoder that maximizes the channel capacity of the estimated channel based on the SRS and a second beamforming gain for the second precoder applied to the CSI-RS.

The UE 120 may receive beamforming gain information from the base station 110 (S207). The base station 110 may transmit, to the UE 120, first beamforming gain information on the first precoder based on the SRS. In addition, the base station 110 may transmit, the UE 120, second beamforming gain information on the second precoder applied to the CSI-RS.

The base station 110 may transmit CSI-RS to the UE 120 (S209), beamforming gain information (S207) including first beamforming gain information of the first precoder (e.g., beamforming gain due to the first precoder) based on the SRS and second beamforming gain information of the second precoder (e.g., beamforming gain due to the second precoder) applied to the CSI-RS. For example, the base station 110 may transmit, to the UE 120, information on a ratio of the first beamforming gain to the second beamforming gain. The ratio of the first beamforming gain to the second beamforming gain may be expressed as follows:
[Equation 1]

$$BF_{Diff}^{gain}[k] = \frac{\frac{\left\|H[k]\tilde{F}_L^{SRS}[k]\right\|_F^2}{\tilde{L}}}{\frac{\left\|H[k]F_{tx}^{CSI}[k]\right\|_F^2}{N_{CSI}^{Port}}}$$

In Equation 1, $BF_{Diff}^{gain}[k]$ is a ratio (or difference) of the first beamforming gain to the second beamforming gain; $H[k] \in \mathbb{C}^{N_{rx} \times N_{tx}}$ is a channel between the UE 120 and the base station 110; $\tilde{F}_L^{SRS}[k]$ is a precoder that maximizes the capacity of a channel estimated based on a SRS; $F_{tx}^{CSI}[k] \in \mathbb{C}^{N_{tx} \times N_{CSI}^{Port}}$ is a second precoder used when the base station transmits a CSI-RS; $\tilde{L}$ is the number of layers of data transmitted by the base station; $N_{CSI}^{Port}$ is the number of antenna ports of the CSI-RS.

The beamforming gain information including the ratio of the first beamforming gain to the second beamforming gain may be referred to as a beamforming gain offset. The beamforming gain offset may be a ratio of a beamforming gain of a PDSCH resource element to a beamforming gain of a non-zero power (NZP) CSI-RS resource element. The beamforming gain offset may have a value in units of dB.

The base station 110 may transmit beamforming gain information to the UE 120 using any one of signaling schemes including radio resource control (RRC), media access control control element (MACCE), and downlink control information (DCI). For example, the base station 110 may transmit, to the UE 120, a radio resource control (RRC) signal including beamforming gain information. As a specific example, the beamforming gain offset may be included in a NZP-CSI-RS-Resource information element.

The UE 120 may receive, from the base station 110, the CSI-RS to which the second precoder is applied (S209). The UE 120 may estimate a channel between the base station 110 and the UE 120 using the received CSI-RS.

In operation S211, the UE 120 may generate feedback information based on a relationship between the first precoder and the second precoder. The relationship between the first precoder and the second precoder may refer to a ratio between the first beamforming gain of the first precoder and the second beamforming gain of the second precoder. For example, the UE 120 may generate CSI-RS feedback information using the received beamforming gain information.

The UE 120 may calculate at least one of a precoding matrix indicator (PMI), a rank, and a channel quality indicator (CQI) using the received beamforming gain information and the estimated channel. For example, the UE 120 may calculate a rank and a PMI that maximize the capacity C of the estimated channel, where the rank and the PMI may be expressed as Equation 2:

$$\left(\tilde{L}, \tilde{F}_L^{PMI}[k]\right) = \arg\max_{L, F_L^{PMI}} C\left(F_L^{PMI}[k]: BF_{Diff}^{gain}[k]H^{CSI}[k]\right). \quad \text{[Equation 2]}$$

In Equation 2, is a ratio (or difference) of the first beamforming gain to the second beamforming gain; $\tilde{L}$ is a rank to be reported by the UE 120 using a rank indicator (RI); $N_{CSI}^{Port}$ is the number of antenna ports of the CSI-RS; $F_L^{PMI}[k]$ is a PMI codebook having a rank L; and $H^{CSI}[k]$ is described below in connection with Equation 3. The channel capacity will be described later in connection with Equation 4.

In relation to Equation 2, the reception signal of the CSI-RS may be expressed as Equation 3:

$$Y_{rx}^{CSIRS}[k] = H[k]F_{tx}^{CSI}[k] + N_{rx}^{CSI}[k] = H^{CSI}[k] + _{rx}^{CSI}[k]. \quad \text{[Equation 3]}$$

In Equation 3, $Y_{rx}^{CSIRS}[k] \in \mathbb{C}^{N_{tx} \times N_{CSI}}$ is a CSI-RS reception signal; $H[k] \in \mathbb{C}^{N_{rx} \times N_{tx}}$ is a channel between the UE 120 and the base station 110; $F_{tx}^{CSI}[k] \in \mathbb{C}^{N_{tx} \times N_{CSI}^{Port}}$ is a precoder used by the base station for CSI-RS transmission; $N_{rx}^{CSI}[k] \in \mathbb{C}^{N_{rx} \times N_{CSI}^{Port}}$ is noise included in the reception signal; and $H^{CSI}[k]$ is a product of a channel between the UE 120 and the base station 110 and a precoder used for CSI-RS transmission. The UE 120 may not separately receive $H[k] \in \mathbb{C}^{N_{rx} \times N_{tx}}$ and $F_{tx}^{CSI}[k] \in \mathbb{C}^{N_{tx} \times N_{CSI}}$. Accordingly, the UE 120 may estimate a value of $H^{CSI}[k]$.

When a PMI codebook $F_L^{PMI}[k]$ having a rank L is applied, the channel capacity C may be expressed as Equation 4:

$$C\{(L, F_L^{PMI}[k]): H^{CSI}[k]\} = \log_2|\sigma^2 I_L + (H_{CSI}[k]F_L^{PMI}[k])^H H^{CSI}[k]F_L^{PMI}[k]|. \quad \text{[Equation 4]}$$

In operation S213, the UE 120 may transmit feedback information to the base station 110. For example, the UE 120 may transmit, to the base station 110, feedback information including a rank indicator (RI) and a CQI calculated using the beamforming gain information and the estimated channel. A CSI report of an embodiment of the inventive concept is described herein based on a subband CSI report. In other embodiments, the CSI report is applied to a wideband CSI report.

In operation S215, the base station 110 may perform scheduling on a second PDSCH. As described above, the base station 110 may perform scheduling on the second PDSCH using at least one of the first precoder based on the SRS and feedback information received from the UE 120. For example, the base station 110 may perform scheduling on the second PDSCH using at least one of the first precoder based on the SRS, and the RI and the CQI received from the UE 120. The base station 110 may determine a rank for the second PDSCH using the received RI. The base station 110 may determine a modulation and coding scheme (MCS) for the second PDSCH using the received CQI. Accordingly, the base station 110 may determine at least one of the rank and the CQI suitable for the UE 120.

In operation S217, the UE 120 may receive the second PDSCH from the base station 110.

FIG. 3 is a flowchart illustrating an operating method of a UE and a base station according to an embodiment of the inventive concept.

Referring to FIG. 3, in operation S301, the UE 120 may transmit an SRS to the base station 110. The base station 110 may receive an SRS from the UE 120. The base station 110 may estimate an uplink channel and a downlink channel between the base station 110 and the UE 120 using the received SRS. In a TDD example, the base station 110 may regard an estimated uplink channel between the base station 110 and the UE 120 as a downlink channel, by using the SRS based on reciprocity. As described later, the base station may design a first precoder based on the SRS.

In operation S303, the base station 110 may design a first precoder applied to a first PDSCH. Specifically, the base station 110 may design the first precoder to maximize the capacity of the estimated channel using the SRS.

The first precoder may be a precoder that is not based on a codebook. For example, the first precoder may include an eigen-vector of a channel between the base station 110 and the UE 120. The first precoder may have a higher resolution than a codebook-based precoder. Accordingly, when the first precoder is used for data transmission, data throughput may be higher relative to a codebook-based precoder implementation. The base station 110 may design the first precoder to maximize at least one metric, such as an MMIB using the estimated channel.

In operation S305, the UE 120 may receive the first PDSCH from the base station 110. The base station 110 may apply a first precoder to the first PDSCH. The base station 110 may transmit, to the UE 120, the first PDSCH to which the first precoder is applied.

In operation S307, the UE 120 may measure a beamforming gain for the first precoder. To this end, the UE 120 may measure a beamforming gain of the first PDSCH to which the first precoder based on the SRS is applied. For example, the UE 120 may measure the beamforming gain of the first PDSCH by measuring the received power of the first PDSCH.

In operation S309, the UE 120 may receive, from the base station 110, a CSI-RS to which the second precoder is applied. The first precoder may differ from the second precoder. The UE 120 may estimate a channel between the base station 110 and the UE 120 using the received CSI-RS.

In operation S311, the UE 120 may measure a beamforming gain for the second precoder. Specifically, the UE 120 may measure a beamforming gain of the CSI-RS to which the second precoder is applied. For example, the UE 120 may measure the beamforming gain of the CSI-RS by measuring the reception power of the CSI-RS.

The UE 120 may estimate a ratio of a beamforming gain for the first precoder based on the SRS to a beamforming gain for the second precoder applied to the CSI-RS. Specifically, the UE 120 may estimate a ratio of the beamforming gains using the measured beamforming gain of the first precoder and the measured beamforming gain of the second precoder. The ratio of the beamforming gains may be expressed as in Equation 1 described above.

In operation S313, the UE 120 may generate feedback information based on a relationship between the first precoder and the second precoder. The relationship between the first precoder and the second precoder may refer to a ratio between the first beamforming gain of the first precoder and the second beamforming gain of the second precoder. For example, the UE 120 may generate CSI-RS feedback information using the measured beamforming gain of the first precoder and the measured beamforming gain of the second precoder. In addition, the UE 120 may generate CSI-RS feedback information using the ratio information of the measured beamforming gain of the first precoder and the measured beamforming gain of the second precoder.

The UE 120 may calculate at least one of PMI, RI, and CQI using the measured beamforming gain and the estimated channel. The rank and PMI may be calculated using the channel and beamforming gain information estimated by the UE 120, and the rank and PMI may be expressed as in Equation 2.

In operation S315, the UE 120 may transmit feedback information to the base station 110. For example, the UE 120 may transmit, to the base station 110, feedback information including a rank indicator (RI) and a CQI calculated using the measured beamforming gain information and the estimated channel.

In operation S317, the base station 110 may perform scheduling on a second PDSCH. As described above, the base station 110 may perform scheduling on the second PDSCH using at least one of the first precoder based on the SRS and feedback information received from the UE 120. For example, the base station 110 may perform scheduling on the second PDSCH using at least one of the first precoder based on the SRS, and the RI and the CQI received from the UE 120. The base station 110 may determine a rank for the second PDSCH using the received RI. The base station 110 may determine a modulation and coding scheme (MCS) for the second PDSCH using the received CQI. Accordingly, the base station 110 may determine at least one of the rank and the CQI suitable for the UE 120.

In operation S319, the UE 120 may receive the second PDSCH from the base station 110.

Figure 4A:
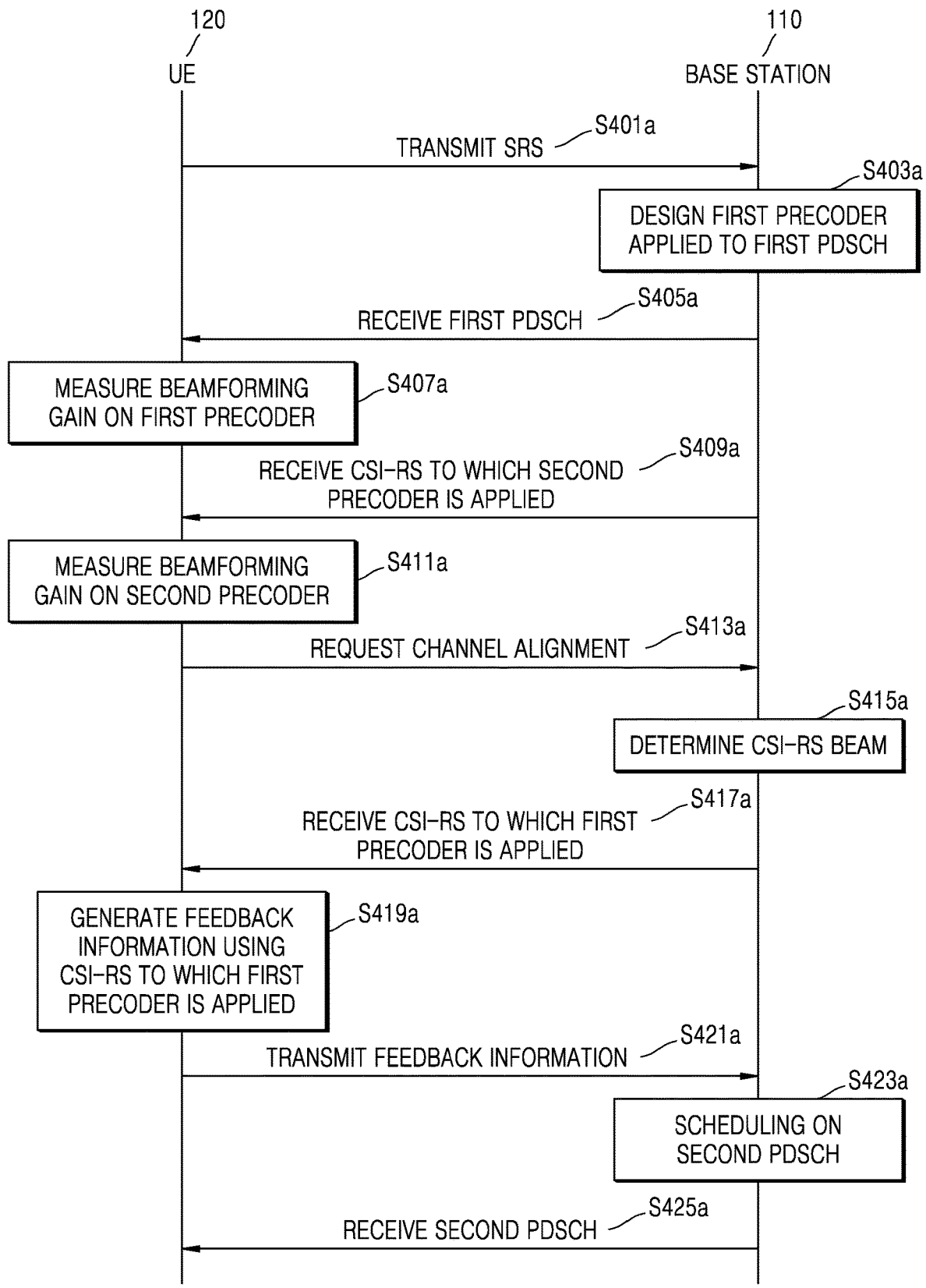
FIG. 4A is a flowchart illustrating an operating method of a UE and a base station, according to an embodiment of the inventive concept.

FIG. 4A is a flowchart illustrating an operating method of a UE and a base station according to an embodiment of the inventive concept.

Referring to FIG. 4A, in operation S401a, the UE 120 may transmit an SRS to the base station 110. The base station 110 may receive an SRS from the UE 120. The base station 110 may estimate an uplink channel and a downlink channel between the base station 110 and the UE 120 using the received SRS. In a TDD example, the base station 110 may regard an estimated uplink channel between the base station 110 and the UE 120 as a downlink channel between the base station 110 and the UE 120, by using the SRS based on reciprocity. As described later, the base station may design a first precoder based on the SRS.

In operation S403a, the base station 110 may design a first precoder applied to a first PDSCH. Specifically, the base station 110 may design the first precoder to maximize the capacity of the estimated channel using the SRS.

The first precoder may be a precoder that is not based on a codebook. For example, the first precoder may include an eigen-vector of a channel between the base station 110 and the UE 120. The first precoder may have a higher resolution than a codebook-based precoder.

Accordingly, when the first precoder is used for data transmission, data throughput may be higher as compared to a codebook-based precoder implementation.

The base station 110 may design the first precoder to maximize a metric, such as an MMIB using the estimated channel. The base station 110 may design the first precoder to maximize various metrics, and is not limited to the above-described embodiments.

In operation S405a, the UE 120 may receive the first PDSCH from the base station 110. The base station 110 may apply a first precoder to the first PDSCH. The base station 110 may transmit, to the UE 120, the first PDSCH to which the first precoder is applied.

In operation S407a, the UE 120 may measure a beamforming gain for the first precoder. Specifically, the UE 120 may measure a beamforming gain of the first PDSCH to which the first precoder based on the SRS is applied. For example, the UE 120 may measure the beamforming gain of the first PDSCH by measuring the received power of the first PDSCH.

In operation S409a, the UE 120 may receive, from the base station 110, a CSI-RS to which the second precoder is applied. The first precoder may differ from the second precoder. The UE 120 may estimate a channel between the base station 110 and the UE 120 using the received CSI-RS.

In operation S411a, the UE 120 may measure a beamforming gain for the second precoder. Specifically, the UE 120 may measure a beamforming gain of the CSI-RS to which the second precoder is applied. For example, the UE 120 may measure the beamforming gain of the CSI-RS by measuring the reception power of the CSI-RS.

The UE 120 may estimate a ratio of a beamforming gain for the first precoder based on the SRS to a beamforming gain for the second precoder applied to the CSI-RS. Specifically, the UE 120 may estimate a ratio of the beamforming gains using the measured beamforming gain of the first precoder and the measured beamforming gain of the second precoder. The ratio of the beamforming gains may be expressed as in Equation 1 described above.

In operation S413a, the UE 120 may transmit a channel alignment request message to the base station 110. For instance, when the measured beamforming gain of the first PDSCH differs from the measured beamforming gain of the CSI-RS, the UE 120 may transmit a channel alignment request message to the base station 110. The UE 120 may request the base station 110 to change the precoder of the CSI-RS by transmitting the channel alignment request message to the base station 110. For example, the UE 120 may request the base station 110 to apply the first precoder of the first PDSCH to the CSI-RS by transmitting the channel alignment request message to the base station 110.

When the base station 110 receives a channel alignment request message from the UE 120, the base station 110 may apply the first precoder to the CSI-RS. In addition, when receiving a channel alignment request message from the UE 120, the base station 110 may design a precoder for the PDSCH without using a PMI codebook. The channel alignment request message may be referred to as a non-PMI based feedback request message. The UE 120 may transmit a non-PMI based feedback request message to the base station 110 by using any one of signaling schemes including RRC, MAC CE, and DCI. For example, the UE 120 may transmit, to the base station 110, a UE assistance information message including a non-PMI based feedback request message. The UE assistance information may be an RRC signaling parameter.

In operation S415a, the base station 110 may determine a beam of the CSI-RS. For example, when receiving a channel alignment request message from the UE 120, the base station 110 may apply, to the CSI-RS, the precoder of the first PDSCH transmitted to the UE 120.

In operation S417a, the UE 120 may receive, from the base station 110, a CSI-RS to which the first precoder is applied. When receiving the CSI-RS in which the non-PMI is set, the UE 120 may determine that the precoders of the CSI-RS and the PDSCH are the same.

In operation S419a, the UE 120 may generate feedback information by using the CSI-RS to which the first precoder is applied. For example, the UE 120 may estimate a channel between the base station 110 and the UE 120 by using the CSI-RS to which the first precoder is applied. Further, the UE 120 may calculate feedback information including at least one of RI and CQI for maximizing the estimated channel.

In operation S421a, the UE 120 may transmit feedback information to the base station 110. The UE 120 may transmit, to the base station 110, feedback information including the calculated RI and CQI.

In operation S423a, the base station 110 may perform scheduling on a second PDSCH. As described above, the base station 110 may perform scheduling on the second PDSCH using at least one of the first precoder based on the SRS and feedback information received from the UE 120. For example, the base station 110 may perform scheduling on the second PDSCH using at least one of the first precoder based on the SRS, and the RI and the CQI received from the UE 120. The base station 110 may determine a rank for the second PDSCH using the received RI. The base station 110 may determine a modulation and coding scheme (MCS) for the second PDSCH using the received CQI. Accordingly, the base station 110 may determine at least one of the rank and the CQI suitable for the UE 120.

In operation S425a, the UE 120 may receive the second PDSCH from the base station 110.

Figure 4B:
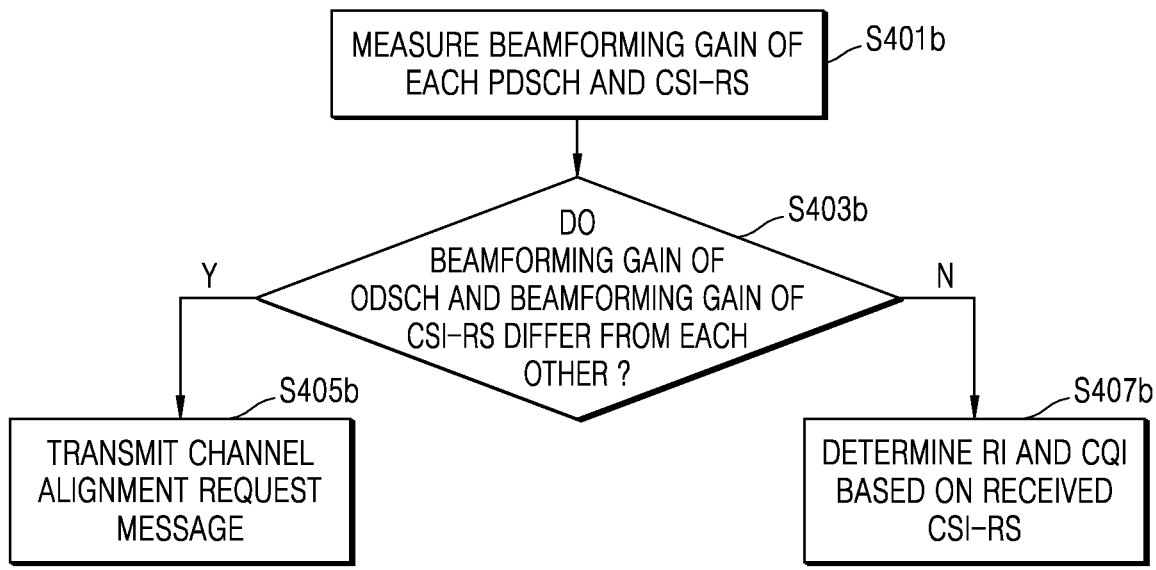
FIG. 4B illustrates an operating method of a UE according to an embodiment of the inventive concept.

FIG. 4B illustrates an operating method of a UE according to an embodiment of the inventive concept. Specifically, FIG. 4B illustrates an example of an operating method of the UE 120 in a situation where the UE 120 measures the beamforming gain of the first precoder and the beamforming gain of the second precoder in FIG. 4A.

In operation S401b, the UE 120 may measure a beamforming gain of each of the PDSCH and the CSI-RS. The UE 120 may measure reception power of each of the first PDSCH and the CSI-RS. The UE 120 may calculate the beamforming gain of the first precoder by measuring the reception power of the first PDSCH. The UE 120 may calculate the beamforming gain of the second precoder by measuring the reception power of the CSI-RS.

In operation S403b, the UE 120 may check whether the beamforming gain of the PDSCH is different from the beamforming gain of the CSI-RS.

In operation S405b, the UE 120 may transmit a channel alignment request message to the base station 110 when the beamforming gain of the PDSCH differs from the beamforming gain of the CSI-RS ("Y" in FIG. 4B). The UE 120 may request the base station 110 to apply the first precoder to the CSI-RS by transmitting the channel alignment request message to the base station 110.

In operation S407b, when the beamforming gain of the PDSCH and the beamforming gain of the CSI-RS are the same ("N" in FIG. 4B), the UE 120 may determine the RI and CQI based on the received CSI-RS. In this case, it may be already considered that the precoder of the CSI-RS is the same as the precoder of the PDSCH.

Figure 5A:
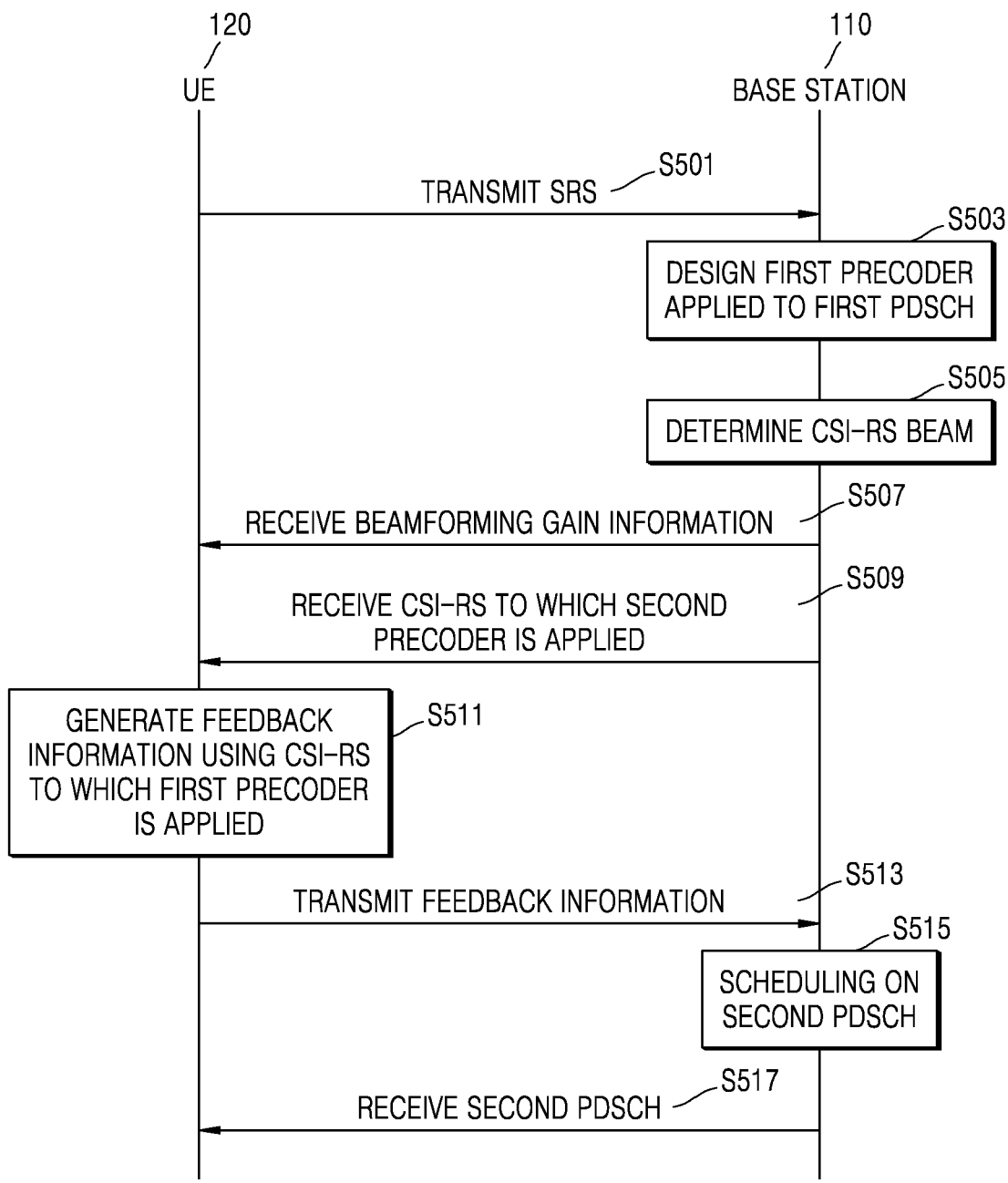
FIG. 5A illustrates an operating method of a base station according to an embodiment of the inventive concept.

FIG. 5A illustrates an operating method of a base station according to an embodiment of the inventive concept.

Referring to FIG. 5A, in operation S501, the UE 120 may transmit an SRS to the base station 110. The base station 110 may receive an SRS from the UE 120. The base station 110 may estimate an uplink channel and a downlink channel between the base station 110 and the UE 120 using the received SRS. In a TDD example, the base station 110 may regard an estimated uplink channel between the base station 110 and the UE 120 as a downlink channel between the base station 110 and the UE 120, by using the SRS based on reciprocity. As described later, the base station may design a first precoder based on the SRS switching.

In operation S503, the base station 110 may design a first precoder applied to a first PDSCH. Specifically, the base station 110 may design the first precoder to maximize the capacity of the estimated channel using the SRS. The first precoder may be a precoder that is not based on a codebook. For example, the first precoder may include an eigen-vector of a channel between the base station 110 and the UE 120. The first precoder may have a higher resolution than a codebook-based precoder. Accordingly, when the first precoder is used for data transmission, data throughput may be higher than when a codebook-based precoder is used for data transmission. The base station 110 may design the first precoder to maximize at least one metric, such as an MMIB, using the estimated channel.

In operation S505, the base station 110 may determine a beam of the CSI-RS. For example, the base station 110 may apply a first precoder to the CSI-RS. In this case, the base station 110 may inform the UE 120 that the first precoder used for PDSCH transmission and the precoder used for CSI-RS transmission have the same beamforming gain.

In operation S507, the UE 120 may receive beamforming gain information from the base station 110. For example, the UE 120 may receive, from the base station 110, information that the first precoder used for PDSCH transmission and the precoder used for CSI-RS transmission have the same beamforming gain. The beamforming gain information may be expressed as in Equation 5:

$$\frac{\left\|H[k]\tilde{F}_L^{SRS}[k]\right\|_F^2}{\tilde{L}} \approx \frac{\left\|H[k]F_{tx}^{CSI}[k]\right\|_F^2}{N_{CSI}^{Port}} \quad \text{[Equation 5]}$$

The UE 120 may receive such beamforming gain information through higher layer signaling related to a transmission configuration information (TCI) state. For example, the UE 120 may receive such beamforming gain information through quasi-co-location (QCL) type signaling, which is a higher layer parameter.

In operation S509, the UE 120 may receive, from the base station 110, a CSI-RS to which the first precoder is applied. The UE 120 may confirm that the precoder applied to the first PDSCH and the precoder applied to the CSI-RS are the same based on the QCL-type information including the QCL-type-E received from the base station 110. The UE 120 may estimate a channel between the base station 110 and the UE 120 using the received CSI-RS.

In operation S511, the UE 120 may generate feedback information by using the CSI-RS to which the first precoder is applied. The UE 120 may calculate at least one of the PMI, RI, and CQI. The rank and PMI may be calculated using the channel and beamforming gain information estimated by the UE 120, and the rank and PMI may be expressed as in Equation 2.

In operation S513, the UE 120 may transmit feedback information to the base station 110. For example, the UE 120 may transmit, to the base station 110, feedback information including a rank indicator (RI) and a CQI calculated using the beamforming gain information and the estimated channel.

In operation S515, the base station 110 may perform scheduling on a second PDSCH. As described above, the base station 110 may perform scheduling on the second PDSCH using at least one of the first precoder based on the SRS and feedback information received from the UE 120. For example, the base station 110 may perform scheduling on the second PDSCH using at least one of the first precoder based on the SRS, and the RI and the CQI received from the UE 120. The base station 110 may determine a rank for the second PDSCH using the received RI. The base station 110 may determine an MCS for the second PDSCH using the received CQI. Accordingly, the base station 110 may determine at least one of the rank and the CQI suitable for the UE 120.

In operation S517, the UE 120 may receive the second PDSCH from the base station 110.

FIG. 5B illustrates a quasi-co-location (QCL)-type applicable to an embodiment of the inventive concept. FIG. 5B specifically illustrates an example of the quasi-co-location (QCL) type described above in step S507 of FIG. 5A.

Referring to FIG. 5B, the channel characteristics of QCL-Type-A include Doppler shift, Doppler spread, average delay, and delay spread. The channel characteristics of the QCL-Type-B include Doppler shift and Doppler spread. The channel characteristics of the QCL-Type-C include Doppler shift and average delay. The channel characteristics of the QCL-Type-D include a spatial Rx parameter. The QCL-Type-D may mean that the wireless communication device shares, with a target signal, the spatial Rx parameter acquired from a source signal. The source signal may be referred to as a source channel. The target signal may be referred to as a target channel. The channel characteristic of the QCL-Type-E may include a beamforming gain parameter. The QCL-Type-E may include an identity between a beamforming gain of a reference signal precoder and a beamforming gain of a PDSCH precoder.

Hereinafter, transmission configuration indication (TCI) will be described. The base station may perform signaling of a TCI state and thereby inform the UE that the base station transmits the PDSCH and a physical downlink control channel (PDCCH) to the UE by using the same beam as the reference signal. That is, the base station may inform the UE that the PDSCH and the PDCCH are transmitted based on the same spatial filter as the specific reference signal. The TCI state may include information on the reference signal. For example, the TCI state may include information on at least one of a synchronization signal block (SSB) and a channel state information-reference signal (CSI-RS). The base station may inform the UE of which TCI the PDSCH and the PDCCH are related through TCI state signaling.

FIG. 6 illustrates an operating method of a UE and a base station according to an embodiment of the inventive concept.

Referring to FIG. 6, in operation S601, the UE 120 may transmit an SRS to the base station 110. The base station 110 may receive an SRS from the UE 120. The base station 110 may estimate an uplink channel and a downlink channel between the base station 110 and the UE 120 using the received SRS. In a TDD example, the base station 110 may regard an estimated uplink channel between the base station 110 and the UE 120 as a downlink channel between the base station 110 and the UE 120, by using the SRS based on reciprocity. As described later, the base station may design a first precoder based on the SRS switching.

In operation S603, the base station 110 may determine a precoder. The base station 110 may design a first precoder applied to the first PDSCH. Specifically, the base station 110 may design the first precoder to maximize the capacity of the estimated channel using the SRS. The first precoder may be a precoder that is not based on a codebook. For example, the first precoder may include an eigen-vector of a channel between the base station 110 and the UE 120. The first precoder may have a higher resolution than a codebook-based precoder. Accordingly, when the first precoder is used for data transmission, data throughput may be higher than when a codebook-based precoder is used for data transmission. The base station 110 may design the first precoder to maximize at least one metric, such as an MMIB, using the estimated channel.

In operation S605, the base station 110 may determine a beam of the CSI-RS. The base station 110 may apply, to the CSI-RS, a second precoder different from the first precoder. For example, the base station 110 may calculate a PMI candidate group. The PMI candidate group may be expressed as Equation 6:

$$\hat{F}_L^{PMI}[k] = \arg\min_{F_L^{PMI}} \sum_L (F_L^{SRS}[k] - F_{tx}^{CSI}[k]F_L^{PMI}[k]), \quad \text{[Equation 6]}$$

where $F_L^{SRS}[k]$ is an SRS switching-based precoder for PDSCH transmission; is a PMI codebook; $F_{tx}^{CSI}[k]$ and is a precoder applied by the base station to the CSI-RS. The base station 110 may calculate each of a precoder based on "SRS switching" and a precoder applied to the CSI-RS and identify a value thereof. Referring to Equation 6, the base station 110 may calculate a PMI candidate group having the smallest difference between the precoder based on SRS switching and the precoder applied to the CSI-RS. The PMI candidate group may have one PMI fixed for each rank.

In addition, the base station 110 may apply, to the CSI-RS based on any one PMI of the PMI candidate group, a precoder applied to the PDSCH and a second precoder having the most similar spatial domain characteristics.

In operation S607, the UE 120 may receive the PMI candidate group. The PMI candidate group may be referred to as a codebook subset restriction. The base station 110 may fix one PMI for each rank by transmitting the PMI candidate group to the UE 120. The base station 110 may omit the PMI by setting all the bitmaps to 0.

In operation S609, the UE 120 may receive, from the base station 110, a CSI-RS to which the second precoder is applied. The UE 120 may estimate a channel between the base station 110 and the UE 120 using the received CSI-RS.

In operation S611, the UE 120 may generate feedback information by using the CSI-RS to which the second precoder is applied. The UE 120 may generate CSI-RS feedback information using the received PMI candidate group information. For example, the UE 120 may calculate at least one of the RI and the CQI using the received PMI candidate group information and the received CSI-RS.

In operation S613, the UE 120 may transmit CSI-RS feedback information to the base station 110. For example, the UE 120 may transmit, to the base station 110, feedback information including the RI and the CQI calculated using the PMI codebook.

In operation S615, the base station 110 may perform scheduling on a second PDSCH. As described above, the base station 110 may perform scheduling on the second PDSCH using at least one of the first precoder based on the SRS and feedback information received from the UE 120. For example, the base station 110 may perform scheduling on the second PDSCH using at least one of the first precoder based on the SRS, and the RI and the CQI received from the UE 120. The base station 110 may determine a rank for the second PDSCH using the received RI. The base station 110 may determine an MCS for the second PDSCH using the received CQI. Accordingly, the base station 110 may determine at least one of the rank and the CQI suitable for the UE 120.

In operation S617, the UE 120 may receive data from the base station 110.

FIGS. 7A to 7D illustrate example beamforming with transmission and reception points (TRPs) according to respective embodiments of the inventive concept. Each of the shown TRPs in FIGS. 7A-7D is an example of the base station 110.

Figure 7A:
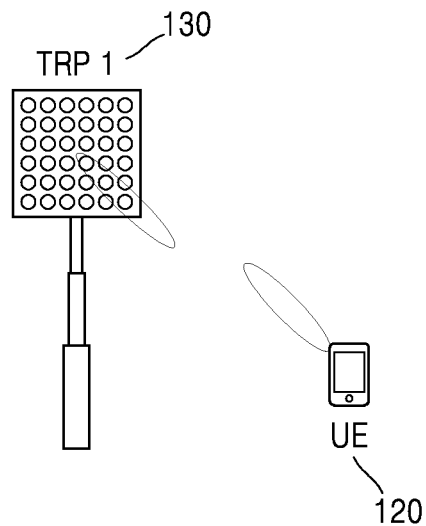
FIGS. 7A, 7B, 7C and 7D illustrate example beamforming with transmission and reception points (TRPs) according to respective embodiments of the inventive concept.
Figure 7B:
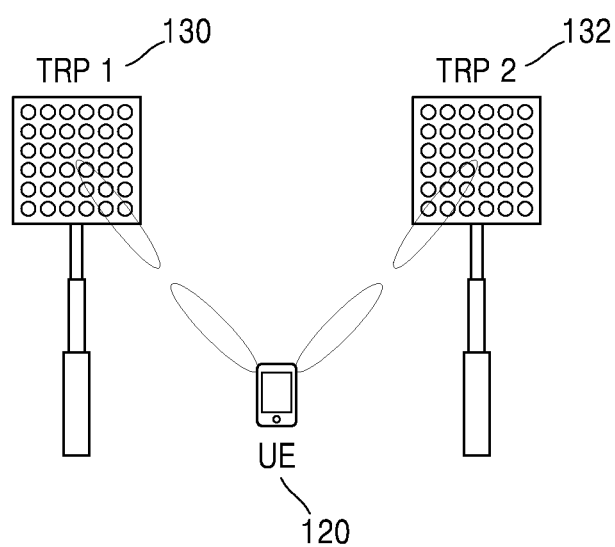
Figure 7C:
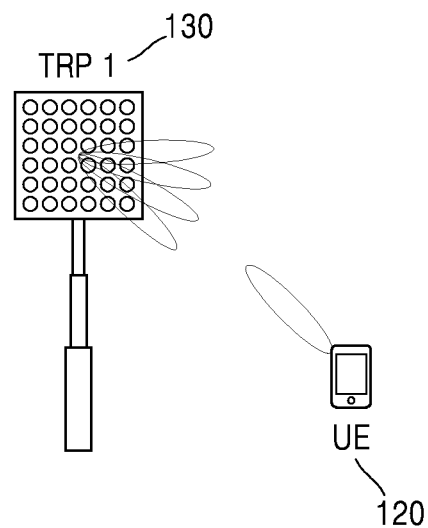
Figure 7D:
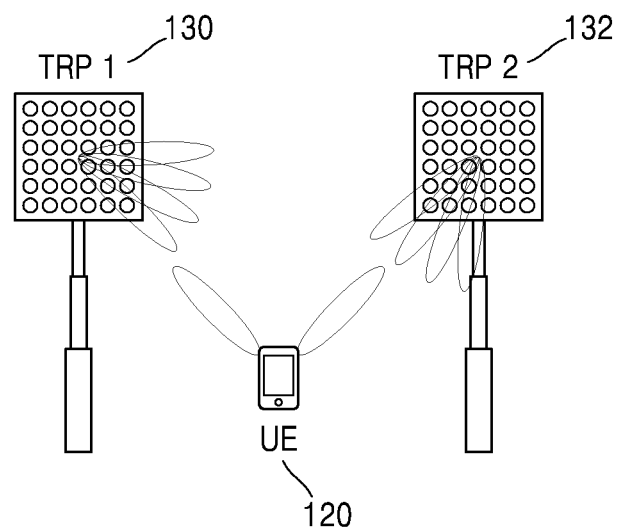

Referring to FIG. 7A, the UE 120 may be connected to a network through a single transmission and reception point (TRP) 130 and a single beam. Referring to FIG. 7B, the UE 120 may be connected to a network through a plurality of TRPs 130 and 132 and one beam for each TRP. Referring to FIG. 7C, the UE 120 may be connected to a network through a single TRP 130 and a plurality of beams formed by the TRP 130. Referring to FIG. 7D, the UE 120 may be connected to a network through a plurality of TRPs 130 and 132 and a plurality of beams formed by each TRP.

The first TRP 130 and the second TRP 132 may transmit different PDSCHs to the UE 120. Specifically, the first TRP 130 may transmit a first PDSCH to the UE 120, and the first TRP 132 may transmit a second PDSCH to the UE 120. For example, the first TRP 130 may transmit downlink control information (DCI) to the UE 120 through a physical downlink control channel (PDCCH). In addition, the first PDSCH and the second PDSCH may be scheduled by the PDCCH transmitted by the first TRP 130. As another example, the first TRP 130 may transmit a first PDCCH controlling the first PDSCH to the UE 120, and the second TRP 132 may transmit a second PDCCH controlling the second PDSCH to the UE 120. Embodiments according to the inventive concept may be applied to communication between the UE 120 and the plurality of TRPs 130 and 132.

For example, the plurality of TRPs 130 and 132 may transmit a CSI-RS to the UE 120, and the plurality of TRPs 130 and 132 may transmit the above-described beamforming gain offset to the UE 120.

In another example, the UE 120 may predict beamforming gains of each of the PDSCH and the CSI-RS with respect to each of the plurality of TRPs 130 and 132. The ratio of the beamforming gains to $n^{th}$ TRP may be expressed as Equation 7:

$$BF_{Diff,n}^{gain}[k] = \frac{\frac{\|H_n^{SCH}[k]\|_F^2}{L_n}}{\frac{\|H_n^{CSI}[k]\|_F^2}{N_{CSI,n}^{Port}}}, \quad \text{[Equation 7]}$$

where n is a TRP index.

In another example, the UE 120 may transmit the above-described channel alignment request message to each of the plurality of TRPs 130 and 132. To this end, the UE 120 may transmit a csi-ReportWithoutPMIRequest message for each of the plurality of TRPs 130 and 132.

In another example, the UE 120 may signal to each of the plurality of TRPs 130 and 132 that a beamforming gain of a precoder used for PDSCH transmission is the same (within a predetermined tolerance range) as a beamforming gain of a precoder used for CSI-RS transmission. Such signaling may be defined as a QCL-Type as described above. The equality of the beamforming gain may be expressed as in Equation 8:

$$BF_{Diff,n}^{gain}[k] = \frac{\frac{\|H_n^{SCH}[k]\|_F^2}{L_n}}{\frac{\|H_n^{CSI}[k]\|_F^2}{N_{CSI,n}^{Port}}}, \quad \text{[Equation 8]}$$

where n is a TRP index. It may be confirmed that the UE 120 receives signaling on the equality of the beamforming gain, and obtains the same beamforming gain when receiving CSI-RS and PDSCH from the plurality of TRPs 130 and 132. Accordingly, the UE 120 may feedback, to each of the TRPs 130 and 132, pieces of information calculated using the received CSI-RS.

As another example, each of the plurality of TRPs 130 and 132 may transmit, to the UE 120, the PMI candidate group. The plurality of TRPs 130 and 132 may apply, to the CSI-RS, a precoder, which is most similar in spatial domain characteristics to a precoder used for PDSCH transmission based on any one PMI of the PMI candidate group. The UE 130 may feed back at least one of the RI and the CQI for each TRP. The PMI candidate group may be expressed as Equation 9:

$$\tilde{F}_{L,n}^{PMI}[k] = \arg\min_{F_{L,n}^{PMI}} \sum_L (F_{L,n}^{SRS}[k] - F_{tx,n}^{CSI}[k]F_{L,n}^{PMI}[k]). \quad \text{[Equation 9]}$$

In Equation 9, n is a TRP index.

The number of TRPs may vary, and is not limited to the above-described embodiments. The embodiments according to the inventive concept may be applied to communication between the UE 120 and the plurality of radio remote heads (RRHs).

Figure 7E:
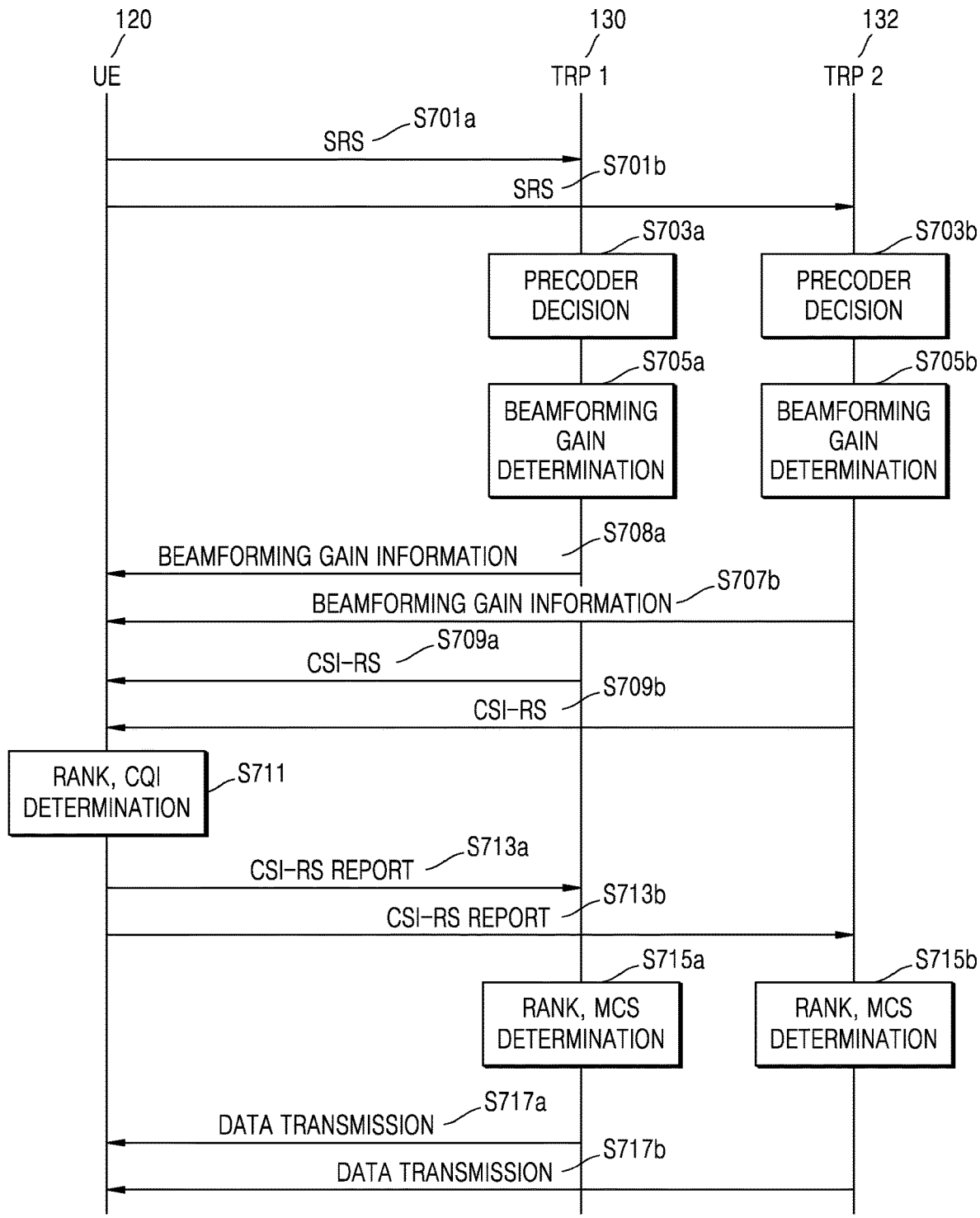
FIG. 7E illustrates an operating method of a UE and TRPs, according to an embodiment of the inventive concept.

FIG. 7E illustrates an operating method of a UE and TRPs according to an embodiment of the inventive concept.

In operation S701a, the UE 120 may transmit an SRS to the first TRP 130. In operation S701b, the UE 120 may transmit an SRS to the second TRP 132. In operation S703a, the first TRP 130 may determine a precoder. Specifically, the first TRP 130 may determine a precoder applied to the PDSCH using the SRS. In operation S703b, the second TRP 132 may determine a precoder. Specifically, the second TRP 132 may determine a precoder applied to the PDSCH using the SRS.

In operation S705a, the first TRP 130 may calculate a beamforming gain of the precoder based on the SRS and a beamforming gain of the CSI-RS precoder. The first TRP 130 may determine beamforming gain information based on the calculated beamforming gain. In operation S705a, the first TRP 130 may calculate a beamforming gain of the precoder based on the SRS and a beamforming gain of the CSI-RS precoder. The second TRP 132 may determine beamforming gain information based on the calculated beamforming gain. In operation S707a, the UE 120 may receive beamforming gain information from the first TRP 130. In operation S707b, the UE 120 may receive beamforming gain information from the second TRP 132. In operation S711, the UE 120 may calculate at least one of the RI and the CQI for each of the first TRP 130 and the second TRP 132 using the CSI-RS received from each of the first TRP 130 and second TRP 132. The UE 120 may generate CSI feedback information for each TRP.

In operation S713*a*, the UE 120 may transmit a CSI-RS report to the first TRP 130. In operation S713*b*, the UE 120 may transmit a CSI-RS report to the second TRP 132. In operation S715*a*, the first TRP 130 may determine at least one of a rank and an MCS. The first TRP 130 may schedule the PDSCH using the precoder based on the SRS and CSI feedback information received from the UE 120. In operation S715*b*, the second TRP 132 may determine at least one of the rank and the MCS. The second TRP 132 may schedule the PDSCH using the precoder based on the SRS and CSI feedback information received from the UE 120. In operation S717*a*, the first TRP 130 may transmit the PDSCH to the UE 120. In operation S717*b*, the second TRP 132 may transmit the PDSCH to the UE 120. The operating method sequence for each TRP of the UE 120 is not limited to the above-described embodiment.

Figure 8:
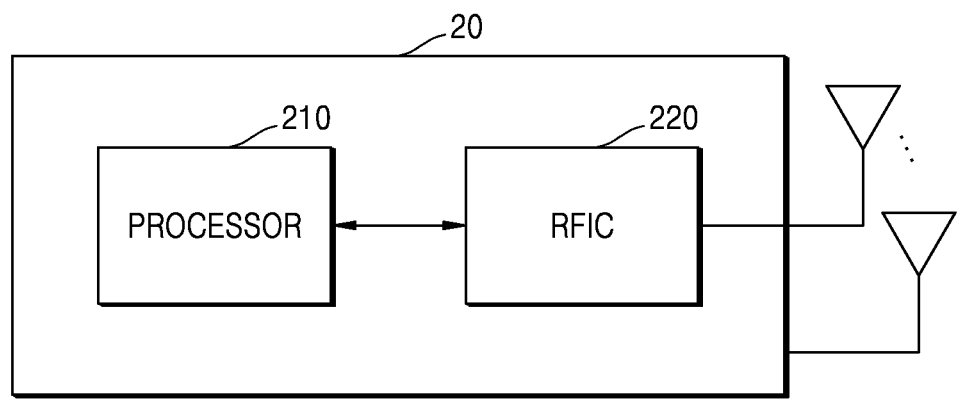
FIG. 8 is a block diagram illustrating a wireless communication device according to an embodiment of the inventive concept.

FIG. 8 is a block diagram illustrating a wireless communication device according to an embodiment of the inventive concept.

Referring to FIG. 8, the wireless communication device 20 (the UE 120 of FIG. 1) may include at least one processor 210 and at least one RFIC 220. The processor 210 may control the RFIC 220, and may be configured to implement operating methods and operating flowcharts of the wireless communication device 20 of the inventive concept. The wireless communication device 20 may include a plurality of antennas, and the RFIC 220 may transmit and receive wireless signals through one or more antennas. At least some of the plurality of antennas may correspond to a transmission antenna. The transmission antenna may transmit a wireless signal to an external device (e.g., another user equipment (UE) or a base station (BS) rather than the wireless communication device 20. At least some of the remaining plurality of antennas may correspond to a reception antenna. The reception antenna may receive a wireless signal from the external device.

As an example, the wireless communication device 20 may include the RFIC 220 that transmits the sounding reference signal (SRS) to the base station and receives, from the base station, the first reference signal to which the first precoder is applied, and a processor 210 that generates feedback information including at least one of a RI and a CQI based on at least one of a relationship between the first precoder and a second precoder applied to a first physical downlink shared channel (PDSCH) by the base station based on the SRS and a channel estimated using the first reference signal.

The RFIC 220 may transmit the generated feedback information to the base station and receive a second PDSCH to which at least one of the second precoder, the RI, and the CQI is applied.

Figure 9:
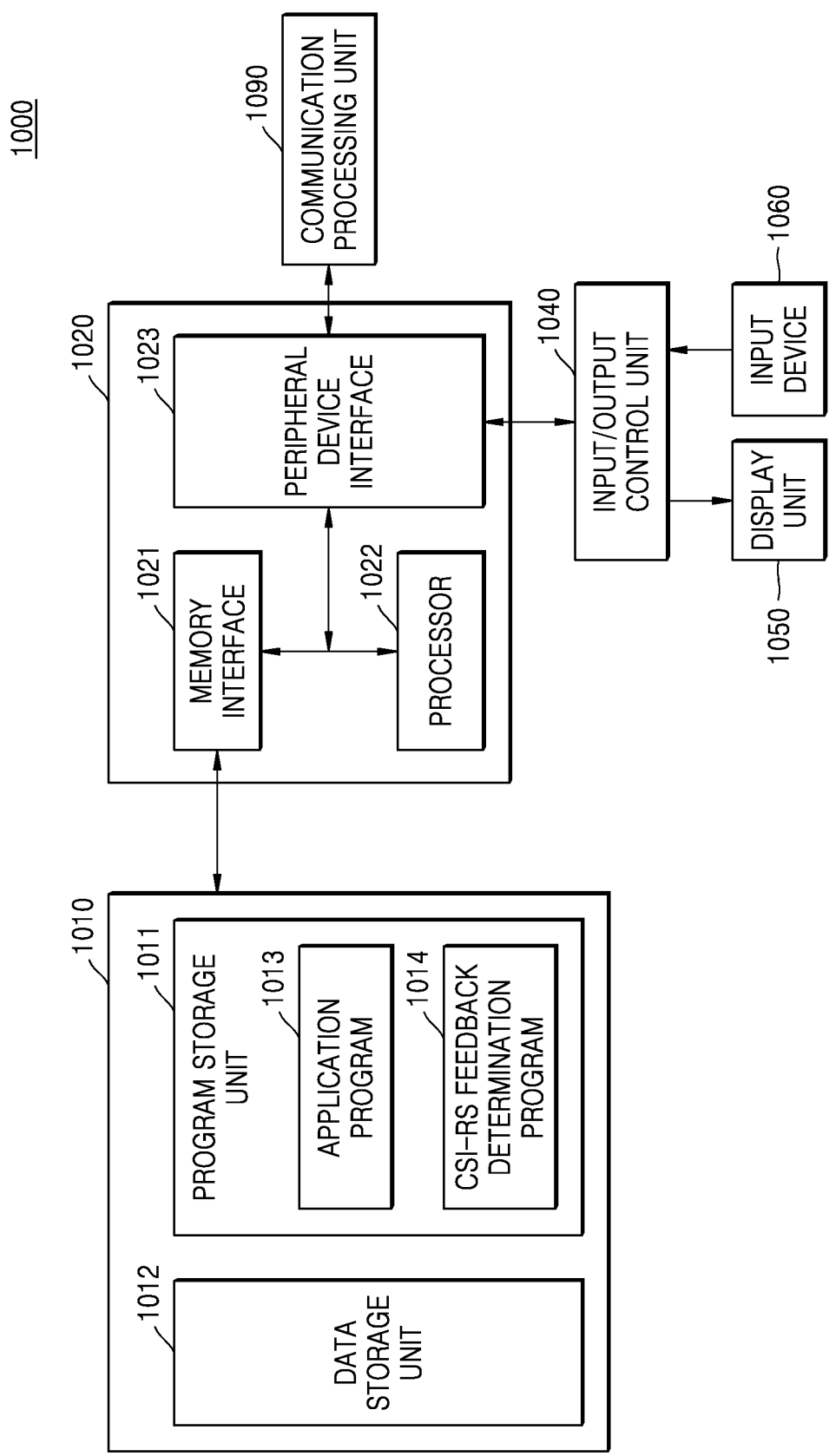
FIG. 9 is a block diagram illustrating an electronic device according to an embodiment of the inventive concept.

FIG. 9 is a block diagram illustrating an electronic device 1000 according to an embodiment of the inventive concept. Referring to FIG. 9, the electronic device 1000 may include a memory 1010, a processor unit 1020, an input/output control unit 1040, a display unit 1050, an input device 1060, and a communication processing unit 1090. Here, the memory 1010 may be provided with a plurality of memory units.

The memory 1010 may include a program storage unit 1011 that stores a program for controlling an operation of the electronic device and a data storage unit 1012 that stores data generated during the execution of the program. The data storage unit 1012 may store data necessary for the operation of an application program 1013 and a CSI-RS density determination program 1014. The program storage unit 1011 may include an application program 1013 and a CSI-RS density determination program 1014. Here, the programs included in the program storage unit 1011 may be expressed as an instruction set or as a set of instructions.

The application program 1013 includes an application program that operates in the electronic device. That is, the application program 1013 may include an instruction of an application driven by the processor 1022. The CSI-RS feedback determination program 1014 may generate CSI-RS feedback based on the relationship between the precoder of the PDSCH and the precoder of the CSI-RS according to embodiments of the inventive concept.

A peripheral device interface 1023 may control the connection between an input/output peripheral device of the base station, and each of a processor 1022 and a memory interface 1021. The processor 1022 controls the base station to provide a corresponding service using at least one software program. In this case, the processor 1022 may execute at least one program stored in the memory 1010 to provide a service corresponding to the corresponding program.

The input/output control unit 1040 may provide an interface between an input/output device, such as the display unit 1050, the input device 1060, or the like, and the peripheral device interface 1023. The display unit 1050 displays state information, input characters, moving pictures, still pictures, and the like. For example, the display unit 1050 may display application program information driven by the processor 1022.

The input device 1060 may provide input data generated by selection of the electronic device to the processor unit 1020 through the input/output control unit 1040. In this case, the input device 1060 may include a keypad including at least one hardware button, a touch pad that senses touch information, and the like. For example, the input device 1060 may provide touch information, such as touch, touch movement, touch release, and the like, which are sensed through the touch pad, to the processor 1022 through the input/output control unit 1040. The electronic device 1000 may include the communication processing unit 1090 that performs a communication function for voice communication and data communication.

While the inventive concept has been particularly shown and described with reference to embodiments thereof, it will be understood that various changes in form and details may be made therein without departing from the spirit and scope of the following claims.

What is claimed is:

1. An operating method of a wireless communication device, comprising:
    transmitting a sounding reference signal (SRS) to a base station;
    receiving, from the base station, a first reference signal to which a second precoder is applied;
    generating feedback information including at least one of a rank indicator (RI) and a channel quality indicator (CQI), based on at least one of: (i) a relationship between the second precoder and a first precoder applied to a first physical downlink shared channel (PDSCH) by the base station based on the SRS; and (ii) a channel estimated by using the first reference signal;
    transmitting the generated feedback information to the base station; and
    receiving a second PDSCH to which at least one of the first precoder, the RI, and the CQI is applied,
    wherein the relationship between the first precoder and the second precoder comprises a gain ratio between a first beamforming gain of the first precoder and a second beamforming gain of the second precoder.

2. The operating method of claim 1, wherein the first reference signal comprises at least one of a channel state information-reference signal (CSI-RS), a synchronization signal block (SSB), a demodulation-reference signal (DM-RS), and a tracking reference signal (TRS).

3. The operating method of claim 1, further comprising receiving, from the base station, a beamforming gain offset indicating the gain ratio.

4. The operating method of claim 1, wherein the generating of the feedback information comprises:
measuring first reception power of the first PDSCH and second reception power of the first reference signal; and
calculating, as the gain ratio, a ratio between the first reception power and the second reception power.

5. The operating method of claim 1, wherein the relationship between the first precoder and the second precoder comprises an equality between the first precoder and the second precoder, and the generating of the feedback information further comprises checking whether the first precoder and the second precoder are identical.

6. The operating method of claim 5, wherein
the checking of whether the first precoder and the second precoder are identical comprises:
measuring first reception power of the first PDSCH and second reception power of the first reference signal;
comparing the measured first reception power with the measured second reception power; and
determining whether the first precoder and the second precoder are identical, based on the comparison result.

7. The operating method of claim 5, wherein the checking of whether the first precoder and the second precoder are identical comprises: determining whether the first precoder and the second precoder are identical based on quasi-co-location (QCL) information received from the base station.

8. The operating method of claim 7, wherein the QCL information is defined as a type indicating that a first beamforming gain of the first precoder and a second beamforming gain of the second precoder are identical.

9. The operating method of claim 5, wherein the generating of the feedback information comprises:
requesting the base station to transmit a second reference signal to which the first precoder is applied, when the first precoder differs from the second precoder;
receiving the second reference signal from the base station; and
determining the feedback information, based on a channel estimated using the second reference signal.

10. An operating method of a base station, comprising:
receiving a sounding reference signal (SRS) from a wireless communication device; generating a first precoder, based on the SRS;
transmitting, to the wireless communication device, a first reference signal to which a second precoder is applied;
determining a precoding matrix indicator (PMI) candidate group, based on the first precoder and the second precoder;
receiving feedback information on the first reference signal including at least one of a rank indicator (RI) and a channel quality indicator (CQI); and
transmitting a physical downlink shared channel (PDSCH) to which at least one of the second precoder, the RI, and the CQI is applied,
wherein the determining of the PMI candidate group comprises determining one PMI for each rank.

11. The operating method of claim 10, wherein the determining of the PMI candidate group comprises determining a PMI which generates a smallest difference between the first precoder and the second precoder, for each rank.

12. The operating method of claim 11, wherein the RI and the CQI are generated by the wireless communication device by using the determined first PMI candidate group.

13. A wireless communication device comprising:
a radio frequency integrated circuit (RFIC) configured to transmit a sounding reference signal (SRS) to a base station, and receive, from the base station, a first reference signal to which a second precoder is applied; and
a processor configured to generate feedback information including at least one of a rank indicator (RI) and a channel quality indicator (CQI) on the basis of at least one of: (i) a relationship between the second precoder and a first precoder applied to a first physical downlink shared channel (PDSCH) by the base station based on the SRS; and (ii) a channel estimated using the first reference signal,
wherein the RFIC transmits the generated feedback information to the base station and receives a second PDSCH to which at least one of the first precoder, the RI, and the CQI is applied,
wherein the relationship between the first precoder and the second precoder comprises a gain ratio between a first beamforming gain of the first precoder and a second beamforming gain of the second precoder.

14. The wireless communication device of claim 13, wherein the first reference signal comprises at least one of a channel state information-reference signal (CSI-RS), a synchronization signal block (SSB), a demodulation-reference signal (DM-RS), and a tracking reference signal (TRS).

15. The wireless communication device of claim 13, wherein the RFIC receives, from the base station, a beamforming gain offset indicating the gain ratio.

16. The wireless communication device of claim 13, wherein the generating of the feedback information comprises:
measuring, by the RFIC, first reception power of the first PDSCH and second reception power of the first reference signal; and
calculating, by the processor, a ratio between the first reception power and the second reception power, as the gain ratio.

17. The wireless communication device of claim 13, wherein the relationship between the first precoder and the second precoder comprises an equality between the first precoder and the second precoder, and the generating of the feedback information further comprises checking, by the processor, whether the first precoder and the second precoder are identical.

* * * * *